Aug. 30, 1927.
P. MORIN ET AL
1,640,797
SHIPPING BOX AND HOLDER FOR FLOWERS AND THE LIKE
Filed Sept. 30, 1925
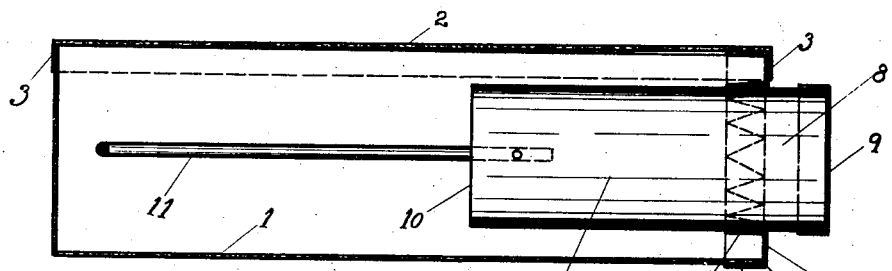
Fig. 1.
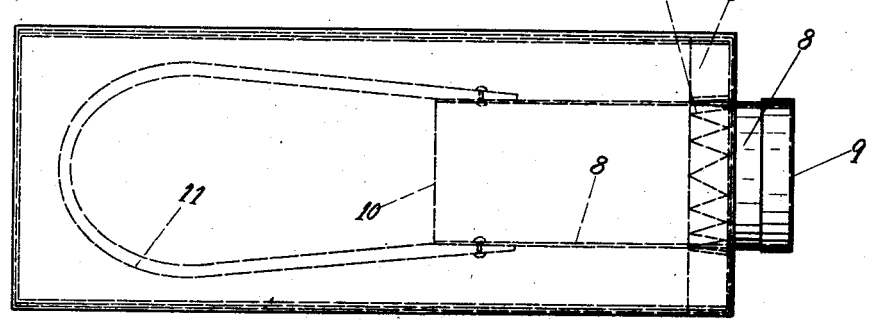
Fig. 2.
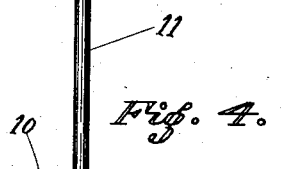
Fig. 4.
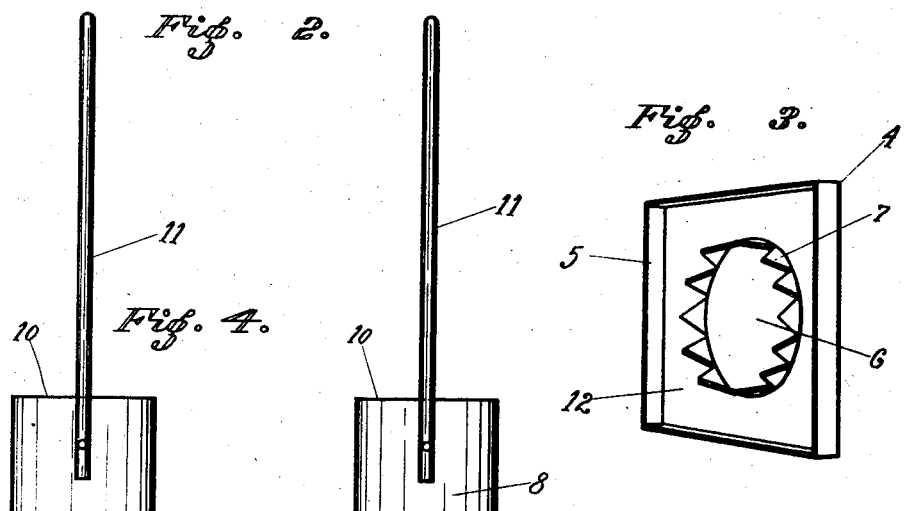
Fig. 3.
Fig. 5.
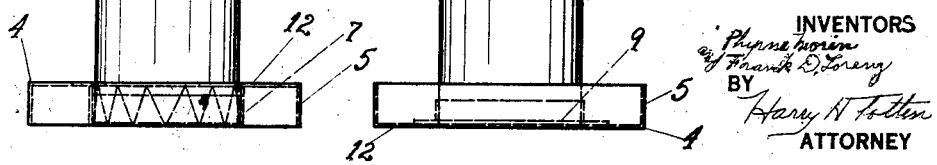
INVENTORS
Phyrne Morin
Frank D. Lorery
BY
Harry H. Totten
ATTORNEY Patented Aug. 30, 1927.

1,640,797

UNITED STATES PATENT OFFICE.

PHYRNE MORIN AND FRANK D. LORENZ, OF BURLINGAME, CALIFORNIA.

SHIPPING BOX AND HOLDER FOR FLOWERS AND THE LIKE.

Application filed September 30, 1925. Serial No. 59,460.

This invention relates to a shipping box and holder designed particularly for flowers and the like.

The invention has for its object to provide a shipping box wherein there is afforded a holder for receiving the stems of the flowers enabling the holder to be set upright and form a vase or support for the flowers when the same are removed from the box. Another object is to provide a structure wherein during the transporting of the flowers the stems are received in the holder, and wherein one wall portion of the box may be utilized to afford a lateral support for the holder to prevent the tipping thereof when flowers of the long stemmed variety may be positioned therein.

The invention is particularly adapted for use by florists in delivering cut flowers to hospitals, sanitariums, and the like, where vases and holding devices are rarely provided, enabling the flowers to be immediately displayed in a suitable holder, overcoming the necessity and bother of searching for vases which are in most instances already in use.

The holding device may be made of waterproof material or may be waterproofed before or after the fluid container is decorated in any manner. It may be provided with or without a handle or transporting means. The holding device may or may not be weighted.

To more fully comprehend the invention, reference is directed to the accompanying drawings, wherein:—

Fig. 1 is a longitudinal sectional view of the preferred form of shipping box and holder.

Fig. 2 is a view in top plan illustrating the box cover in position.

Fig. 3 is a view in perspective of the removable end wall illustrated in Figs. 1 and 2.

Fig. 4 is a view in elevation of the holder removed from the box, set in an upright position, and the removable end wall affords a lateral support therefor.

Fig. 5 is a view of a modified structure wherein the removable wall of the box is attached to the base of the holder.

In the drawings wherein like characters of reference indicate the corresponding parts, 1 designates a box preferably of the oblong type and of the construction usually employed by florists in shipping cut flowers. The open top of the box is closed by a cover 2, peripherally flanged as at 3. One end of the box is preferably open, and is normally closed during the shipping by a removable end wall 4, the same being preferably flanged at 5 and formed with a central opening 6, the peripheral wall of which is surrounded by the inwardly projecting serrated friction members 7. The end wall 4 is positioned to close the open end of the box 1 with its flange 5 lying exteriorly of the ends of the walls of the box, as in Fig. 1, and the cover 2 is positioned with its flange 3 projecting downwardly over the outer face of the end wall 4.

Within the opening 6 is mounted to snugly fit an elongated tubular, or any other suitable shape, holder 8 closed at its outer end at 9, and its inner open end 10 opening into the interior of the box. The holder is longitudinally adjustable through the opening 6 in the end wall 4 to accommodate flower stems of various lengths, and the same may be waterproofed in any suitable manner, and if desirable a transporting handle 11 may be mounted thereon. In the structure illustrated in Figs. 1 to 4 inclusive, the removable end wall 4, in affording a support for the vase or holder 8, is slid longitudinally off the closed end 9 of the vase, is reversed and is again positioned on the closed end of the holder so that its face or wall surface 12 will be disposed transversely above the lower end of the holder, with the edges of the flange 5 resting on the support. This removable wall affords a support to the lateral tipping of the holder when desired.

In the structure illustrated in Fig. 5, a modified form of end wall is shown, and in this form the closed end 9 of the holder is secured to the end wall and the holder and end wall are of substantially unit construction. However, when desirable the flange 5 may be removed leaving a flat wall support for the holder 8 extending laterally from its base.

It will be observed that in our present invention, we afford a shipping box for the flowers and a vase or holder for the same when they are removed from the box, and also that the vase or holder when within the box affords a receptacle for the stems of the flowers during their shipment.

Having thus described our invention what we claim as new and desire to protect by

Letters Patent of the United States is:—

1. A shipping box and holder for flowers and the like comprising a box having a removable outer wall and an open top, a cover for closing the open top of the box and for holding the removable outer wall thereto, and a holder carried by the removable outer wall and extending into the box said holder removable from the box with said removable outer wall.

2. A shipping box and holder for flowers and the like comprising a box having a removable outer wall and an open top, a cover for closing the open top of the box and for holding the removable outer wall thereto, and a holder carried by the removable outer wall and extending into the box, said removable outer wall affording a base for supporting the holder when the latter is removed from the box.

3. A shipping box and holder for flowers and the like comprising a box having a removable outer wall and an open top, a cover for closing the open top of the box and for holding the removable outer wall thereto, and a holder detachably carried by the removable outer wall and extending into the box.

4. A shipping box and holder for flowers and the like comprising a box having a removable outer wall and an open top, a cover for closing the open top of the box and for holding the removable outer wall thereto, and a holder detachably connected with the removable outer wall, said holder extending into the box and through the box wall.

5. A shipping box and holder for flowers and the like comprising a box having a removable peripherally flanged outer wall and an open top, a peripherally flanged cover for closing the open top of the box with its flange overhanging a portion of the main body of the removable outer wall for holding the removable outer wall to the remainder of the box, and a holder carried by the removable outer wall and extending into the box with its inner end opening into the box.

6. A shipping box and holder for flowers and the like comprising a box having a removable outer wall, the latter provided with an opening, a holder longitudinally movable in said opening and provided with an open end opening within the box, said removable wall adapted to provide a lateral support for said holder when the same is removed from the interior of the box.

7. A shipping box and holder for flowers and the like comprising a box having a removable cover forming one side wall of the box, one end wall of the box provided with an opening, a tubular holder removably positioned within said end wall opening with the open end opening into the box, a portion of said holder projecting through said opening and beyond said end box wall said holder adapted for detachment from said box end wall, and when detached therefrom and removed from the interior of said box adapted to rest on the end thereof projecting through said opening and affording a holder for supporting upright the articles contained thereon.

In testimony whereof we have signed our names to this specification.

PHYRNE MORIN.
FRANK D. LORENZ.